May 10, 1949.　　　　　A. WINTHER　　　　　2,469,706
ELECTRONIC TENSION CONTROL APPARATUS
Filed May 4, 1944　　　　　　　　　　　　　　　6 Sheets-Sheet 1

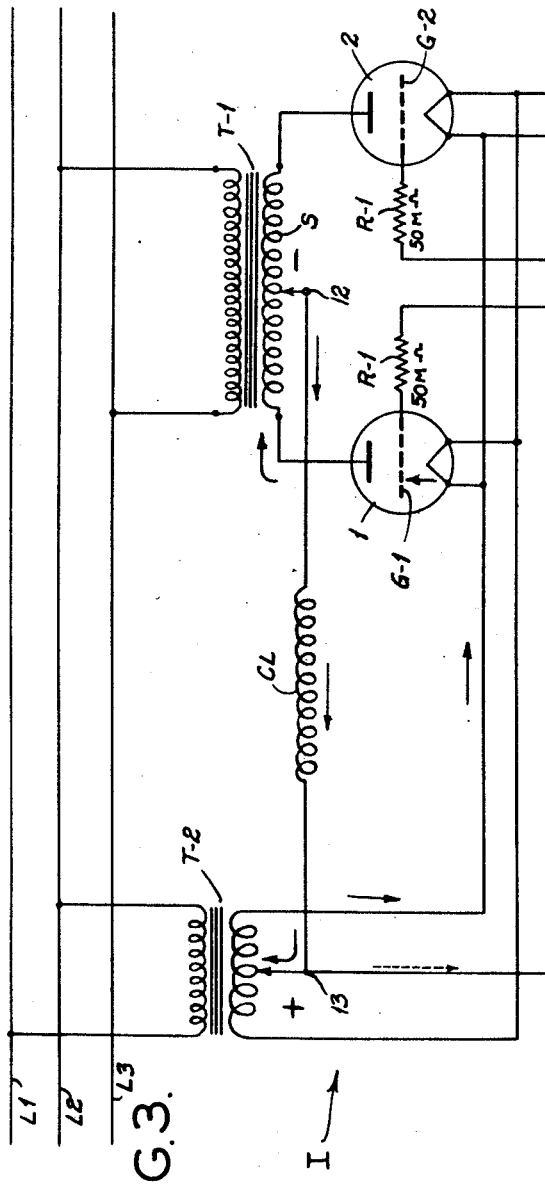
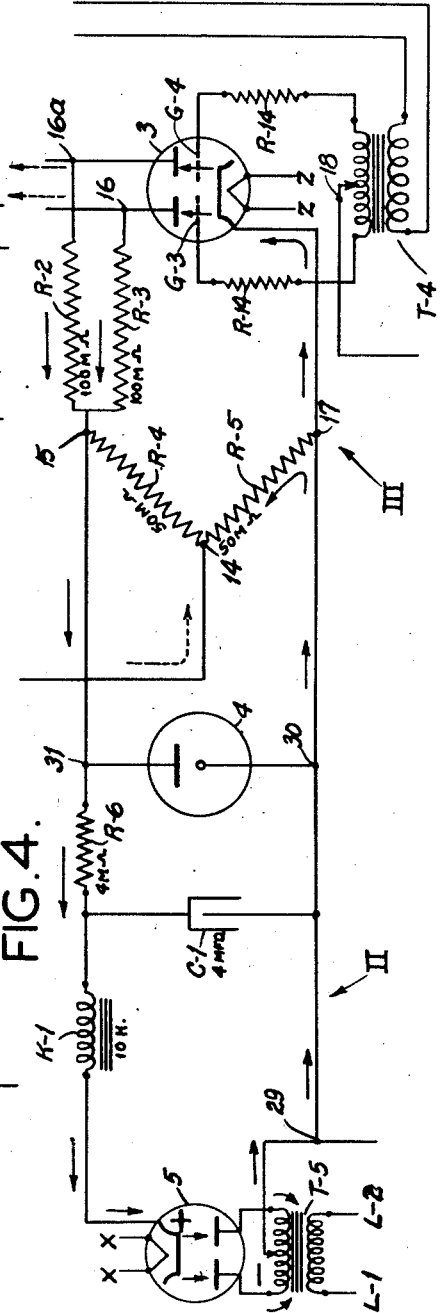

May 10, 1949.　　　　　A. WINTHER　　　　2,469,706
ELECTRONIC TENSION CONTROL APPARATUS
Filed May 4, 1944　　　　　　　　　　　　　　6 Sheets-Sheet 4
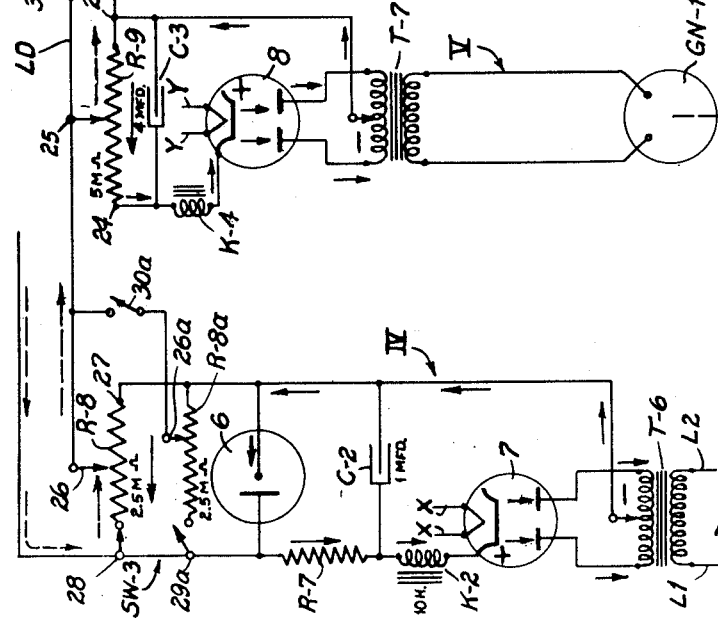

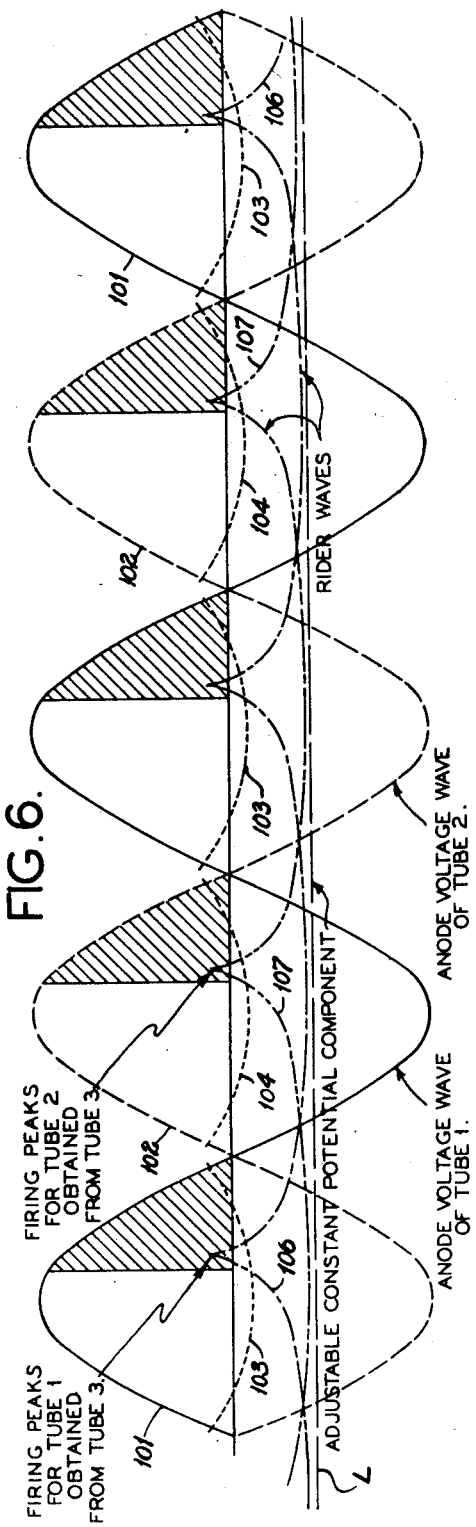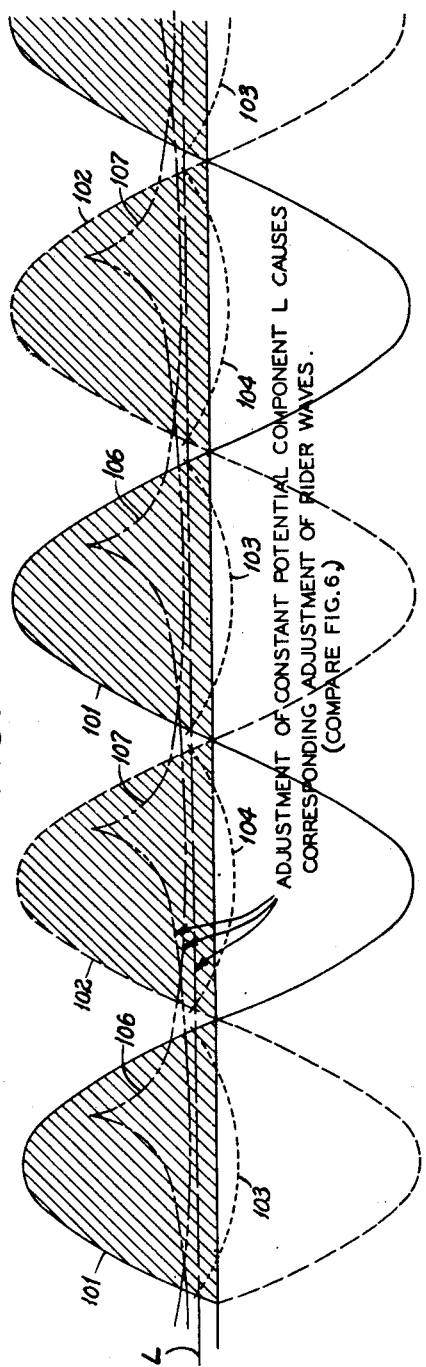

TORQUE VS SPEED CURVES FOR VARIOUS THICKNESSES OF MATERIALS. SLOPES INCREASE WITH INCREASE OF MATERIAL THICKNESS.

Patented May 10, 1949

2,469,706

UNITED STATES PATENT OFFICE 2,469,706

ELECTRONIC TENSION CONTROL APPARATUS

Anthony Winther, Kenosha, Wis., assignor to Martin P. Winther, Waukegan, Ill., trustee Application May 4, 1944, Serial No. 534,111

18 Claims. (Cl. 242—75)

1

This invention relates to electronic control apparatus, and with regard to certain more specific features, to tension control apparatus for more closely controlling the speed of and tension in material which is unwound or wound.

Among the several objects of the invention may be noted the provision of reliable means for providing substantially uniform linear speed and tension in material which is being unwound for processing and rewound, with gradually decreasing and increasing roll diameters in the unwinding and winding processes respectively; the provision of means of the class described which will automatically smoothly adjust torque to roll diameter so as to reduce it according to lower roll diameters and increase it according to greater roll diameters; the provision of apparatus of the class described which at the beginning of a winding operation will allow for overriding operator control; and the provision of apparatus of this class which in a given design is, without redesigning, applicable to a wide variety of materials requiring widely different tensions. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a diagrammatic mechanical and electrical layout showing in gross the relationship between various units employed;

Fig. 2 is a complete wiring diagram of one of the control units shown in Fig. 1;

Fig. 3 is a wiring diagram of a principal rectifier circuit I;

Fig. 4 is a wiring diagram of a basic voltage supply circuit II and a connected tilting bridge circuit III;

Fig. 5 is a wiring diagram of four control circuits IV, V, VI and VII;

Fig. 6 is an illustrative diagram but not to scale of the wave actions of certain rectifier tubes;

Fig. 7 is a diagram similar to that of Fig. 6, showing the results of certain resistance adjustments; and, Fig. 8 is a plot showing relationships between speed, torque and electrical conditions under certain operating conditions.

Similar reference characters indicate corresponding parts throughout the several views of the drawings.

Often it is necessary to process wound material by unwinding it from one reel, passing it through a processing machine, and then winding it upon another reel. For the present purpose, the material may be considered to be raw material on the reel from which it is unwound and finished material on the reel into which it is wound. In between it passes through the processing machine, which may, for example, be a rolling mill, calendering machine or the like.

Two main problems are involved. One is to retard the reel delivering the raw material so as to maintain a proper and substantially uniform tension in the raw material, and the other is to wind up the finished material under conditions which maintain a proper and substantially uniform tension therein. Thus it becomes desirable that the torque (moment) applied to a reel shall be lower when the roll diameter is smaller and higher when the roll diameter is larger. Inasmuch as the accumulating material in effect applies an increasing torque arm to the tensioned material, it is apparent that, for a substantially constant tension or force at the longer arm, the applied torque should be increased as the material is wound onto a wind-up reel. Also, as material is unwound from a pay-off reel the retarding torque must be decreased as the material is unwound. All this must be accomplished preferably at some constant linear velocity which is an optimum for the finishing machine. The tension desired is of a different optimum for each material being handled.

Eddy-current clutches are peculiarly well adapted to the above mentioned constant-tension type of service, except that when once designed for a given application, they are not always effective for another, except by use of the present invention. A former one of these eddy-current clutches, with a governor for velocity control, is shown, for example, by United States Patent 1,982,461, dated November 27, 1934. Thus because of the wide range of tensions required for different materials, as well as the wide speed ranges over which units of this class must operate, it is desirable to have a definite control of the torque, as well as of the speed of certain eddy-current clutches, for reeling and unreeling.

Figure 1:
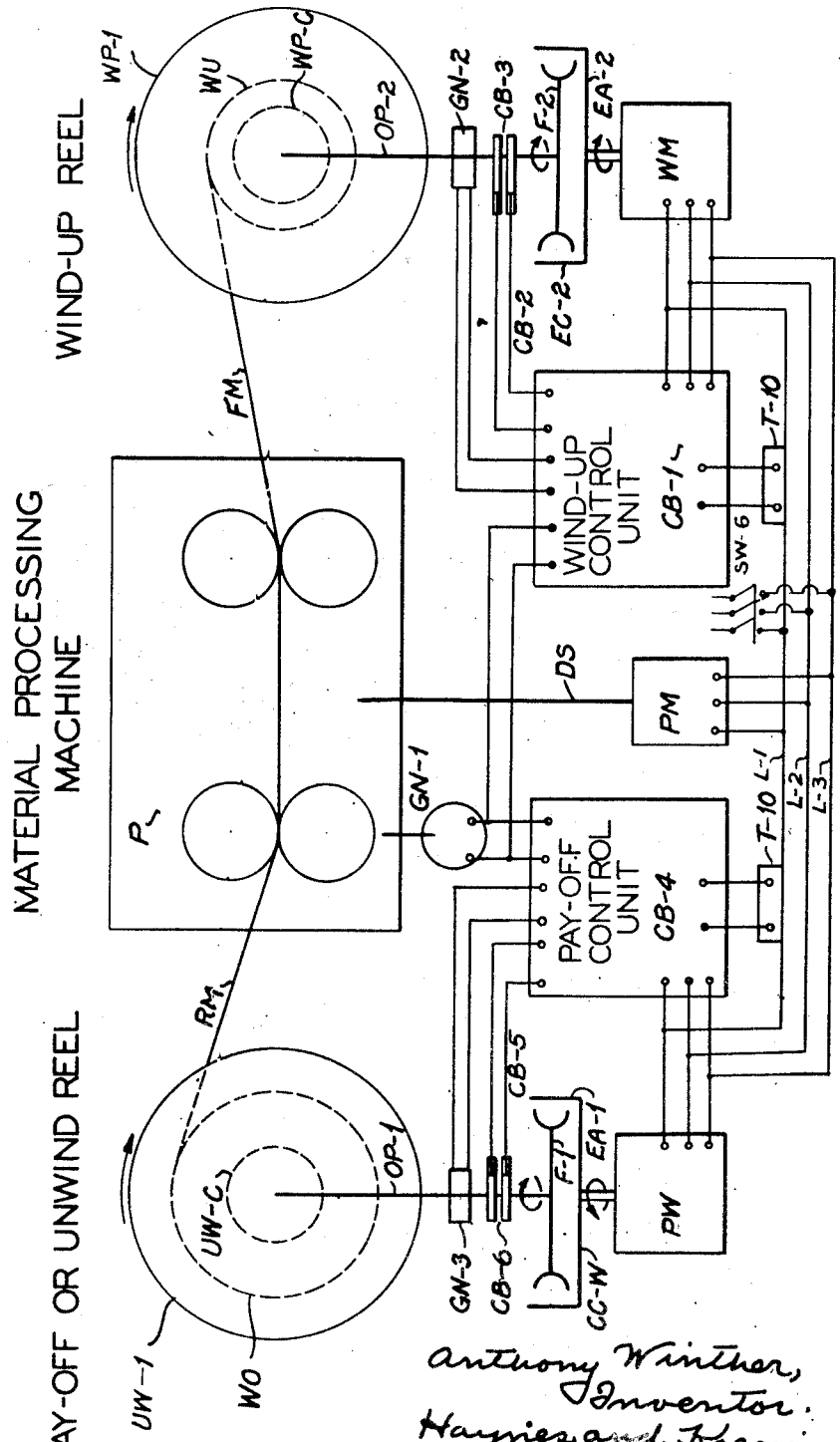

Referring now more particularly to Fig. 1, there is shown a material processing machine P driven from a three-phase A. C. motor PM through a suitable mechanical drive which includes a drive shaft DS. The motor is energized from the wires L—1, L—2 and L—3 of a 60 cycle three-phase A. C. circuit. A main switch SW—6 completely controls energization of this A. C. circuit.

At UW—1 is a pay-off or unwind reel which carries on its core UW—C windings WO of raw material RM. This material RM passes to the processing machine P and emerges as finished material FM, the latter passing to the windings WU on a core WP—C of a wind-up or finished-material reel WP—1. Both of the reels UW—1 and WP—1 rotate clockwise. The machine P drives UW—1, RM acting as a flexible connector. WP—1 is driven to maintain tension in FM.

Reel WP—1 is driven by means of a shaft OP—2 from the field member F—2 of an eddy-current slip clutch EC—2. The inductor drum EA—2 of the slip clutch is driven by means of an A. C. motor WM, the latter being fed by said A. C. circuit.

At CB—1 is shown in general an electronic control composed of the electronic circuit hereinafter described. This is for controlling the electromagnetic field of the field member F—2 of the slip clutch EC—2 so as to tighten or loosen the magnetic coupling and thus controlling the slip, and hence the velocity and the torque transmitted, as will appear. The electronic circuit of the control CB—1 is energized from said A. C. circuit. It is connected to the windings of field member F—2 by circuit CB—2 and slip rings CB—3. The slip between the armature drum EA—2 and the field member F—2 of the clutch EC—2 increases as the field strength decreases and vice versa. The armature EA—2 overruns the field F—2 in the direction of rotation of the shaft OP—2 for wind-up operation. This direction will be designated herein as forward. Shaft OP—2 drives an A. C. generator GN—2 connected to CB—1.

The reel UW—1 is rotated forward by withdrawal therefrom of the raw material RM. In order to maintain proper tension on this withdrawn material, a braking action is supplied by means of a second eddy-current slip clutch CC—W having an armature EA—1 driven backward from a motor PW. The clutch CC—W includes a field member F—1 connected to the reel UW—1 by means of a shaft OP—1. Since the field member F—1 rotates in the same direction as the field member F—2 and the armature EA—1 is driven backward by the motor PW, an inductive braking action is exerted by EA—1 on F—1 as long as the field member F—1 is energized. Thus torque from motor PW is used as a brake on UW—1 to maintain tension in raw material RM.

As indicated, the motor PW is also energized from the A. C. circuit. An electronic control unit CB—4 is fed by said A. C. circuit and in turn controls the field circuit of field F—1 (see line CB—5 and slip ring CB—6). Generator GN—3 is driven from shaft OP—1 and is electrically connected to CB—4.

Phase L—1 of the A. C. circuit energizes current transformers T—10 which respectively feed the control units CB—4 and CB—1. An A. C. generator GN—1 driven by machine P is connected to feed both units CB—4 and CB—1.

Figure 2:
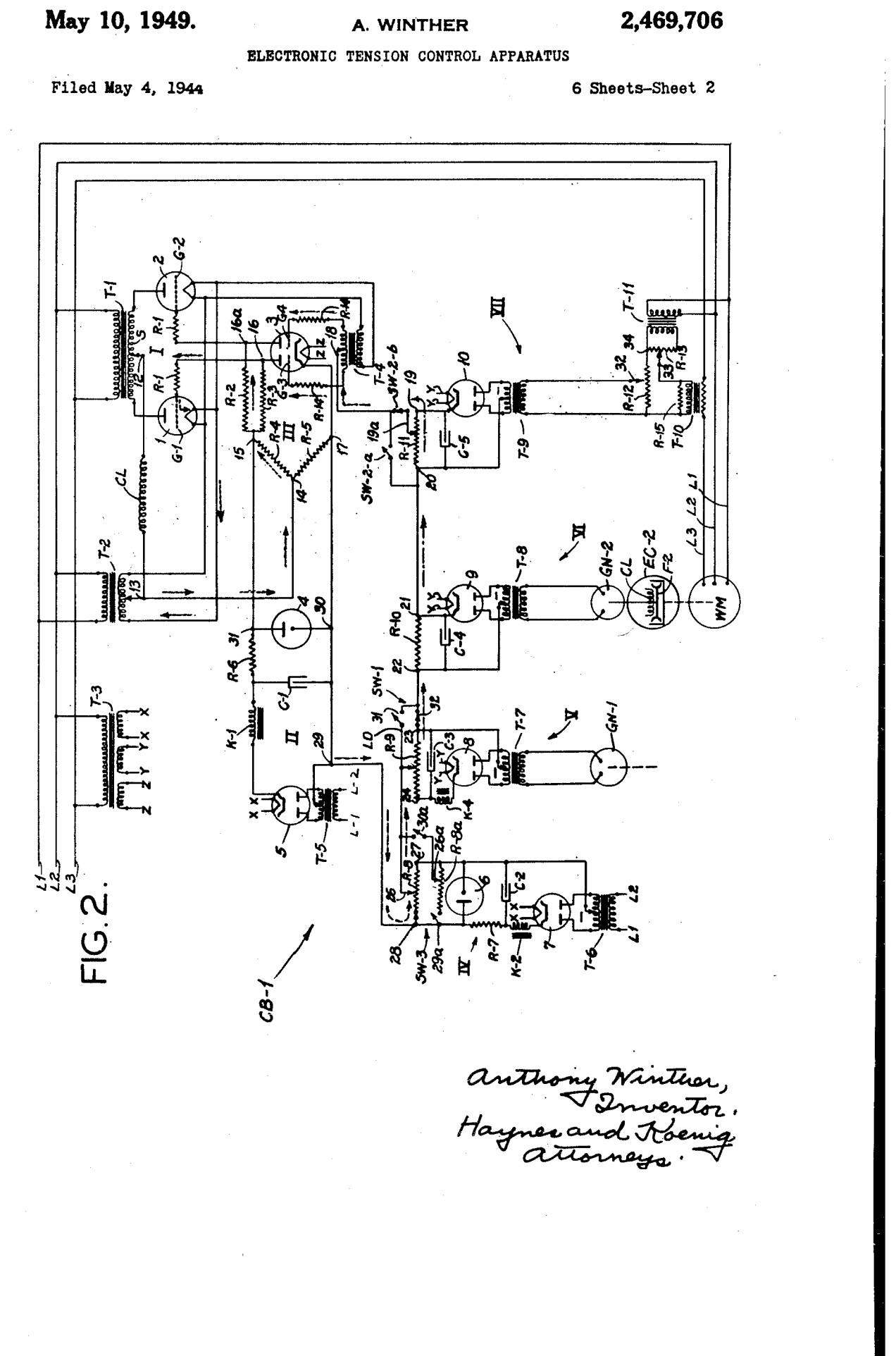

In Fig. 2 is shown the wiring diagram of the contents of the control unit CB—1. Since the contents of the control box CB—4 operate according to the same principles as those of the box CB—1, detailed description of the latter will be sufficient to gain a complete understanding of the invention. This circuit has seven main divisions as follows, referring to Fig. 2 in general:

(1) A principal D. C. rectifier circuit I (Fig. 3);

(2) A main or basic voltage supply circuit II with the usual filters and regulators for maintaining constant voltage (Fig. 4);

(3) A tilting bridge circuit III (Fig. 4);

(4) A manually-controlled adjustable reference voltage circuit IV (Fig. 5);

(5) An auxiliary machine-speed-controlled reference voltage circuit V (Fig. 5);

(6) A clutch speed control circuit VI (Fig. 5); and, (7) A clutch torque control circuit VII (Fig. 5).

Circuits IV and V are connected in voltage aiding sequence and so are circuits VI and VII, but the voltage sum from IV and V, and voltage sum from VI and VII, are arranged for voltage opposition. Also, circuits V and/or VII may at will be cut out without changing the opposition relation of the residual voltages. How this may be done will appear.

Referring to the principal rectifier circuit I, similar ones have been described in my Reissue Patent 22,432, dated February 1, 1944, and in Patent 2,277,284, dated March 24, 1942. This circuit I consists of a transformer T—1 having a primary winding connected across the lines L—2 and L—3 of the A. C. circuit. The secondary S of this transformer T—1 is connected at its opposite ends to the anodes of a pair of three-element, hot cathode, gas-filled, grid-controlled rectifier tubes 1 and 2 of the half-wave type. These tubes require proper grid potential to fire. They are characterized by the fact that the grid of each tube can start the anode current, but cannot shut it off. However, when the alternating anode voltage passes through zero, the current dies out automatically. The effect of the grid action is to start the respective tube firing at one point or another on one swing of the A. C. anode voltage wave. Different total average D. C. currents are passed as determined by the grid actions. A two-anode amplifier tube 3 in the tilting bridge circuit III effects alternate firing of tubes 1 and 2, its anodes being respectively connected with the grids of tubes 1 and 2.

A mid-tap 12 of the secondary S is connected to one end of the field coil CL of the slip clutch EC—2. The coil CL is in the slip clutch EC—2 which has been diagrammed at the lower part of the figure. To avoid diagram complexities the coil CL has been shown twice. In the upper part of the diagram it is located in the circuit and in the lower part its mechanical location only is indicated with respect to the field member F—2, without showing it in the circuit.

The other end of the field coil CL is connected to the mid-tap 13 of a transformer T—2, the primary of which is connected across lines L—1 and L—2. The opposite ends of the secondary of the transformer T—2 are connected in parallel with the cathodes of the respective tubes 1 and 2. Control of the tubes 1 and 2 is managed by means of grids G—1 and G—2 respectively. Resistances R—1 limit the current flowing through the grids so that they are substantially voltage controlled from the anodes of tube 3. When the tubes 1 and 2 fire (which occurs alternately, as will appear), the anodes alternately feed direct current to opposite ends of the secondary S. Thus direct current flows from the center tap 12 of transformer T—1 through the coil CL and to the center tap 13 of the transformer T—2.

Alternating current applied to circuit I from the secondary of transformer T—2, proceeds to the cathodes of the tubes 1 and 2 and is rectified to produce said direct current. The transformer T—2 is connected 120° out of phase with respect to the transformer T—1, being connected across L—1, L—2. The effect of this in connection with other parts of the circuit will appear.

In view of the above, it will be seen that the secondary S of transformer T—1 applies an alternating voltage to the anodes of the tubes 1 and 2. Whenever the grid G—1 and anode of the tube 1 are positive enough, its cathode passes current toward the anode and through the clutch coil CL. Thus this tube becomes a half-wave rectifier. The action of the tube 2 is similar, but alternating with respect to the action of tube 1. The solid arrows in Fig. 3 illustrate an exemplary flow of electrons when they occur through tube 1.

As stated, circuit II is a main reference voltage circuit. By its means reference voltage is established for setting a main level of potential for controlling the grids of the principal rectifier tubes 1 and 2. This reference voltage circuit II originates in a secondary component of a transformer T—5, the latter being fed from the lines L—1 and L—2. Rectified negative current under a given voltage issues from the cathode of tube 5, induced by the action of the transformer T—5 (see the solid arrows, Fig. 4). The cathode is heated by connection XX from a secondary component of a cathode supply transformer T—3, the latter being fed from the lines L—2 and L—3. Thus voltage is applied from the mid-tap of T—5 through points 29, 30 and then to point 17. Here the circuit splits, part of the voltage being applied through resistance R—5, and part being applied to the cathode of the amplifier tube 3. The heating element of the cathode of tube 3 is connected to a secondary component ZZ of said transformer T—3. Thus voltage is impressed upon the anodes of tube 3 and the circuit is completed to tube 5 via resistances R—2, R—3, points 15 and 31, resistance R—6 and choke K—1 back to the cathode of tube 5. The circuit is completed as indicated by the solid arrows in Fig. 4 whenever tube 3 fires an anode.

Condenser C—1, cold cathode tube 4, resistance R—6 and choke K—1 are related so as to effect filtering and regulation to maintain constant voltage conditions in circuits II and III. Tube 4 acts as a voltage regulating leak. Details of this type of voltage regulation have also been specified in my U. S. patent applications, Serial No. 513,057, filed December 6, 1943, now abandoned, and Serial No. 519,783, filed January 26, 1944, now Patent No. 2,411,122, issued November 12, 1946.

Resistance R—5 is connected with resistance R—4 at point 14. Resistance R—4 connects with point 15. The mid-tap 13 of the transformer T—2 is connected with the point 14 between the resistances R—5 and R—4. Resistances R—5, R—4, the tube 3, and the resistances R—2 and R—3, considered alternatively, constitute a bridge through which voltage on grids G—1 and G—2 is applied.

The rectifier tube 3 has grids G—3 and G—4 controlling flow of negative electrons to its respective anodes and the respective anodes feed the grids G—1 and G—2 of the rectifier tubes 1 and 2 respectively, resistances R—1 being used in the circuits of said grids G—1 and G—2. Thus when either of the grids G—3 or G—4 is relatively negative with respect to the cathode of tube 3, the firing of the latter is suppressed to the respective anode. When either of these grids is relatively positive, the tube 3 fires to the respective anode. When tube 3 fires, this increases the negative electrons in grid G—1 or G—2 of tubes 1 or 2, tending to suppress firing of the relevant one of these tubes. When grid G—1 or G—2 is starved of negative electrons, that is, when the relevant part of tube 3 does not fire, then the respective grid G—1 or G—2 becomes relatively positive and the relevant tube 1 or 2 fires. In short, tubes 1 and 2 respectively tend to fire when the relevant anodes of tube 3 do not, and vice versa.

The grids G—3 and G—4 of tube 3 are supplied through resistances R—14 from the secondary of a transformer T—4. The primary of a transformer T—4 is energized from the cathode circuit supplied by transformer T—2 as shown in Fig. 2. The firing voltage for the grids of the principal tubes 1 and 2 is also amplified through the tube 3 which is of the proper type for the purpose.

The transformer T—4 imposes on the grids G—3 and G—4 of the amplifier tube 3 sinusoidal voltages phased 180° apart, which also are respectively 120° out of phase with the respective voltages applied to the anodes of the tubes 1 and 2, because transformer T—4 receives its primary supply from the secondary of transformer T—2. It will be noted that transformer T—2 which supplies T—4 is connected across wires L—1 and L—2 of the A. C. line, and transformer T—1, which affects tubes 1 and 2, receives its supply from lines L—1 and L—3. As will be shown, the sinusoidal voltages on 3 are voltage rider waves on a D. C. control voltage applied from circuits IV, V, VI and VII to point 18 of T—4. Thus the major portions of the waves applied to grids G—1 and G—2 will be fairly flat, as will appear. Since the anodes and cathodes of tube 3 are connected across the reference voltage of the circuit II, a D. C. current similar in shape to a half-wave rectified current is drawn from the system II, the waves being controlled alternately by the grids G—3 and G—4. Since the actions of the grids G—3 and G—4 alternately make each half of the tube 3 a half-wave rectifier, it will be seen that each anode of the tube passes current alternately in accordance with the A. C. potential developed by the transformer T—4. Hence the form of the direct current furnished by the circuit II through each anode of tube 3 is that of a current shaped in accordance with the wave of transformer T—4. Thus a firing action occurs alternately on the anodes of tube 3 and this firing will affect the grids G—1 and G—2 alternately and independently.

Since the principal tubes 1 and 2 can each be fired only when its appropriate anode voltage is positive, the firing must be and is done during that time for each tube (see Fig. 6). The anode sine waves 101, 102 applied to tubes 1 and 2 are shown, the one for tube 1 as a solid line, and the one for tube 2 as a dash line. The firing voltage of tube 1 is represented by dotted lines 103, and it will be noticed that these dotted lines 103 reappear in succeeding cycles under 101. Dotted lines 104 represent the corresponding firing voltage line in the succeeding cycles belonging to tube 2. Therefore the dotted lines show the grid voltages which would be necessary to fire the tubes 1 and 2. Lines 103 and 104 for matched tubes are nearly the same but same variations are to be expected. The dot-dash line 106 represents the cusped but otherwise fairly flat D. C. voltage wave induced by the combination of the D. C. reference voltage on point 18 of transformer T—4, and the A. C. voltage applied to grid G—3 of tube 3 by this same transformer T—4. Double-dot-dash line 107 is the corresponding line for grid G—4. The D. C. lines 106 and 107 each comes to a peak once under each positive loop of lines 101 and 102 respectively.

It will also be noticed that waves 106, 107 are inverse to the waves 101, 102 applied to tubes 1 and 2, and represent a series of half-wave type D. C. conditions. These waves 106 and 107 may be shifted up and down by adjusting a resistance R—8a (to be described) to effect various firing intersections with lines 103 and 104. This shifts the basic D. C. line L, which represents the D. C. control voltage at 18 of T—4. Fig. 7 illustrates the result of such a shift. Wherever (Fig. 6) the curves 106, 107 intersect the grid-firing voltage curves 103 and 104, the tubes 1 and 2 will be fired (see the cross-hatched areas), and since the cusps of the curves 106 and 107 are relatively steep and can be made even steeper than illustrated on the drawing, it is possible to sweep these curves through the entire lateral ranges of the firing voltages 103 and 104 much more effectively and with more definite control of the firing point of the tubes. Fig. 7 illustrates the maximum upward adjustment of L and full firing of tubes 1 and 2. By using the cusps of the waves 106, 107 to intersect the broad crests of the grid-firing voltage curves 103, 104 and by inverting in respect to the anode voltages 101, 102 applied to tubes 1 and 2, the action is such as to eliminate any effect of one firing voltage peak on another.

It is to be understood that the lines 106 and 107 diagrammatically indicate the conditions above mentioned and that there may be minor variations in the particular wave forms which carry out the stated principles. The important principle is that wherever either curve 106 or 107 intersects grid-firing voltage curve 103 or 104, respectively, to effect firing, the respective curve 106 or 107 is concave upward.

Hence all tendency for so-called wave overlap in tubes 1 and 2 (such as occurred in older systems) is eliminated. A great saving is effected in tube life and erratic action avoided such as was heretofore caused by different "grid-firing voltage curves" of different tubes. In other words, the major portions of the curves of the firing voltages 106 and 107 are flat, with the cusps as desired. Thus it is not possible, as heretofore, for the applied A. C. firing voltage substantially to intersect the entire firing voltage at once which with improperly matched tubes would cause one to assume a substantial overload.

Tests made with this equipment indicate that the control of the tubes is much more accurate than by the use of a broad 90° firing control wave with a curving and gentle top, as previously used. This is because the two tubes 1 and 2 in the single-phase circuit are fired substantially equally due to the steepness of the approach between pairs of curves such as 106, 103; 107, 104. Unlike the old scheme, differences in tube "grid-firing voltage curves" such as 103 and 104 will result in very little unbalance of firing load carried by tubes 1 and 2.

The mid-tap 18 of the secondary of the transformer T—4 is connected with circuit VII at 19 and the mid-tap of transformer T—5 is connected with the circuit IV at 28. Circuits IV and V operate in voltage aiding sequence with the voltage from point 29. The circuit IV is a manually adjustable reference voltage circuit and the circuit V is an auxiliary reference voltage circuit under speed control of machine P.

Circuit IV has a supply transformer T—6 which is energized from wires L—1 and L—2 of the A. C. circuit. Circuit V is energized from a transformer T—7, the primary of which is energized from the A. C. generator GN—1 driven by a mechanical power take-off PT from the machine P. The generator GN—1 produces voltage only when the processing machine P is operative. When the processing machine P is shut off, then only circuit IV of the pair IV and V is relied upon for controlling energization of coil CL. The purpose of the control by circuit IV during the time that the processing machine P is not running is to control tension in the material under static conditions. For adjusting the control by means of the operator, the potentiometer R—8a with a sliding point 26a is used.

The function of the auxiliary governing circuit V is to supply a part of the total reference voltage required while the processing machine is operating. It will be seen that, when the machine P stops, the generator GN—1 stops, so that this circuit V then no longer supplies a portion of the voltage, and a lower reference voltage results. Thus the total controlled reference voltage is made up of the addition of voltages of circuits IV and V when the machine P is operating at the desired speed, plus the voltage from point 29. A function of circuit V is to hold the tension substantially constant on the processing material when the speed of the processing machine P is varied to accommodate the requirements of different raw materials.

In detail, circuit IV consists in a rectifier tube 7 the anodes of which are connected with said transformer T—6 energized from line wires L—1 and L—2. The center tap of this transformer T—6 connects with potentiometers R—8 and R—8a. Potentiometer R—8 is of the fixed type and point 26 is placed in such a position on R—8 with respect to point 27 that a desired minimum voltage will be obtained when the circuit V is cut out of action by stoppage of the processing machine P. The resistance R—8a includes a manually controlled tap 26a for manually controlling the voltage taken from the circuit IV. A switch SW—3 having three components has a normally closed contact at 28 and two normally opened contacts at 29a and 30a. When the two normally opened contacts 29a and 30a are closed and the normally closed contact 28 is opened, resistance R—8 is removed and resistance R—8a is substituted. On the other hand, when the contacts at 29a and 30a are opened and the one at 28 is closed, then the resistance R—8 is effective and the resistance R—8a is cut out. The circuit IV from point 28 or 29a is completed through the resistance R—7, choke K—2 and through the cathode of the tube 7. A condenser C—2 and cold cathode tube 6 serve to maintain constant voltage conditions in this circuit. The solid arrows (see Fig. 5) in circuit IV show the local current path through it. Tube 7 is heated through connection X—X with T—3.

In detail, circuit V originates at the anodes of tube 8, being completed through the secondary of transformer T—7, point 23, variable resistance R—9, point 24, choke K—4 and the cathode of tube 8. A condenser C—3 serves the usual filtering purposes in association with the choke K—4. The solid arrows in circuit V (see Fig. 5) show the current path through it. A switch SW—1 has a normally open contact 31 and normally closed contact 32. By closing contact 31 and opening 32, the output lead LD of the circuit IV is connected directly to the terminal 22 of circuit VI. This isolates circuit V. Tube 8 is heated from YY of T—3.

As stated, the voltages from circuits IV and V and from point 29 oppose the voltage generated by the circuits VI and VII or by one of them. These voltages from IV, V and 29 all are directed to point 22 and pass from that point to the grids G—3 and G—4 of tube 3 via resistance R—10, point 21, variable resistance R—11 (or switch element SW—2—a), mid-point 18 of transformer T—4, resistances R—14 to the grids G—3 and G—4 of tube 3. In Figs. 2 and 5 the voltage effects from point 29 to 22 are shown by dashed arrows. Beyond point 22, to the right and to 18, the sum of the voltage effects from IV, V and 29 is indicated by dot-dash arrows.

In detail, circuit VI is constituted by a rectifier tube 9, the anodes of which are connected to the secondary of a transformer T—8. The primary of the transformer T—8 is supplied by a variable voltage generator GN—2 driven from the field member F—2 of clutch EC—2, for example. Voltage from the mid-tap of the secondary of transformer T—8 is supplied to point 22 in opposition to the voltage from circuits IV and V. The circuit VI is closed through resistance R—10, point 21 and the cathode of tube 9. The condenser C—4 is used for the usual filtering purpose. Local circulation is shown by the wavy arrows (Fig. 5). The heater element of the cathode of tube 9 is fed from connection YY of the secondary of the cathode transformer T—3. Thus the circuit VI, like the circuit V does not depend for energization upon the A. C. line, but upon the speed of an independent generator, namely GN—2.

In detail, the circuit VII is constituted by a rectifier tube 10 the anodes of which are connected to the secondary of a transformer T—9. The middle tap of a secondary of this transformer T—9 is connected to point 20, the circuit being completed through resistance R—11, point 19, to the cathode of the tube 10, the condenser C—5 serving filtering purposes. Local circulation is here also shown by wavy arrows. The voltage of circuit VII is in the same sequence with the voltage from circuit VI, and the sum of these two voltages is in opposition to that from the sum of the sequence voltages from the circuits IV and V and point 29. Point 19 of the circuit VII is connected to the mid-tap 18 of the secondary of transformer T—4 through a normally closed element b of a switch SW—2. This switch element is by-passed by a normally opened element a of the same switch SW—2. Thus circuit VII may be isolated by opening the switch element b and closing the switch element a. Tube 10 is heated from YY of T—3.

The primary of the transformer T—9 is energized from the A. C. circuit through means adapted to provide a voltage from circuit VII which is substantially a straight-line function of the torque delivered by the A. C. motor WM. This is accomplished by means of a current transformer T—10 having a primary in the line L—3 and a secondary which feeds the primary of the transformer T—9. Resistance R—15 is connected across the secondary of the transformer T—10. This provides a load.

Voltage transformer T—11 has its primary connected across the lines L—1 and L—2 of the A. C. circuit. Resistance R—13 is connected across its secondary and has a variable tap 33 connected to the secondary of transformer T—10. Point 34 of transformer T—11 is connected to the variable tap 32 of a resistance R—12. By a suitable adjustment of the resistances R—12 and R—13, the transformer T—11 can be caused to buck down that component of current generated in the transformer T—10 as is caused by the magnetizing requirements of the motor WM. The transformer T—11 is so connected and 32 and 33 are so adjusted that the voltage generated by T—11 cancels the voltage generated by the transformer T—10 when the motor is idling. Thus the load-ampere curve of the motor is substantially a straight line and the effect is to correct for power factor. The circuit between transformers T—9, T—10 and T—11 may be referred to as a transformer circuit component in governing circuit VII for obtaining a straight-line relationship between the voltage on T—9 and torque on the motor WM. Potentiometer R—13 is the one that bucks out magnetizing current and R—12 changes the slope of the straight-line voltage-current relationship.

Since the current drawn in lines L—3 by the motor WM is practically proportional to the torque of the motor, and since the transformer T—11 bucks out the magnetizing current, control is unaffected by such magnetizing current and the voltage output of transformer T—9 is therefore substantially proportional to motor torque.

The motors WM, PW and PM operate at constant speed, being of the induction type. The armature EA—2 of the clutch EC—2 overruns field F—2 and shaft OP—2. Thus the maximum speed of the reel WP—1 will always be less than the maximum speed of the motor WM. Therefore, regardless of the controlled speed, EA—2 tends to overdrive the output member F—2, and therefore, produces a tension in the finished material FM.

The speed with which the shaft OP—2 can run is governed by the rate at which the material PM is delivered from the machine P. The eddy-current clutch EC—2 will slip under torque which increases with the slip between F—2 and EA—2. Hence the speed of the material FM virtually controls the speed of the reel WP—1 and the function of the eddy-current clutch EC—2 is to apply nearly constant tension to the material. This requires regulation of the torque produced by the clutch EC—2. This torque should increase in a fairly direct proportion from a low value when the material starts at the core WP—C, to a higher value at the rim. In other words, the torque applied must with the building up of the material, increase as closely as is practicable to maintain the desired substantially constant tension in the material. If the torque were not increased the tension would become gradually less and less. The practicable limits referred to in the case of the present invention are uses wherein the ratio between a final winding diameter to an initial winding diameter is not over approximately 5:1.

Circuits I, II and III, considered independently of any other circuits have constants such that tubes 1 and 2 are fired and energize coil CL. This is because the bridge points 16 and 16a are normally more positive than bridge point 14, for example, by about 75 volts. In other words, grids G—1 and G—2 of tubes 1 and 2 are held positive to fire these tubes. This corresponds to a certain coupling in clutch EC—2 and a cer-core speed of the reel EC—2.

The reference voltage produced by the combination of the circuits IV and V tends also toward firing of tubes 1 and 2 and increase of clutch excitation. This is because negative potential from these circuits is applied to the grids G—3 and G—4 of the tube 3. This biases tube 3 toward shutoff, thus robbing grids G—1 and G—2 of tubes 1 and 2 of negative electrons. The firing action from tubes 1 and 2 is proportional to the action of circuit IV or IV plus V.

Circuits VI and VII are connected so that their individual potentials add together and the total of these in opposition to the potentials of circuits IV and V tends to stop firing of tubes 1 and 2, which accounts for the governing action of these circuits VI and VII. In other words, the circuits VI and VII tend to make the grids G—3 and G—4 of tube 3 more positive, thus favoring firing of tube 3 which supplies the grids G—1 and G—2 of the tubes 1 and 2 with proportionate suppressing negative potential.

At the beginning of the wind-up with the reel WP—1 practically empty, the reel speed must be its maximum running speed corresponding to the speed of the processing machine. At the start, the reel WP—1 will accelerate to any speed necessary to keep the material in tension. This maximum speed is provided by action of circuit IV wherein R—8 is adjusted to give this result. As the reel accumulates material at a constant linear velocity of material, the angular velocity of the reel will tend to become less and the EC—2 clutch slip will increase. Increased clutch slip slows down the generator GN—2 which reduces the plus values contributed by it to the grids G—3 and G—4 of tube 3. This reduces the firing of tube 3, thus increasing the output of tubes 1 and 2. This tightens the clutch coupling and increases the applied moment so that proper tension tends to be maintained in FM in view of the growing lever arm caused by the growing diameter of the reel. However, in view of the inherent slip-torque characteristics of the clutch, this may or may not be the desired rate of change to maintain substantially enough constant tension in the material. Any incipient changes in tension in FM affect the moment or torque applied by FM to the roll WU at any given diameter of the latter. For example, an incipient increase in tension will increase torque, and an incipient decrease in the tension of FM will decrease torque applied to the roll. These incipient torque changes are of course transmitted to the motor WM. For example, an increase of torque required of the motor WM, due to increased tension in FM, would cause more current to be drawn by the motor, thus increasing the plus output of circuit VII into the grids G—3 and G—4. This increases firing of tube 3 and places more negative on grids G—1 and G—2 and reduces firing of tubes 1 and 2. The result is less energization of the clutch coil and more clutch slip, which incipiently decreases torque applied to the reel and corrects said incipient increase in tension of FM. If the tension in FM were incipiently to decrease, the action would be the inverse to that just described.

Thus it will be seen that decrease in reel speed due to increasing size of roll WU automatically calls into play reduced action from circuit VI tending gradually to tighten the coupling and increase torque delivered from the motor according to the growing moment arm of roll WU; but incipient changes in reactive torque due to incipient changes in the tension in FM are corrected through the action of circuit VII, the action of this circuit VII being independent of slip-torque characteristics of the clutch and therefore corrective of any undesirable deviation of this characteristic from what is desired.

It should also be noted that as the roll WU builds up, circuit VI, due to reduction in speed of GN—2, supplies less of the control voltage, circuit VII supplying more.

Thus circuits IV and V and circuit VI constitute the main balancing control circuits as winding starts. As winding continues, circuit VII provides more of the governing control voltage and circuit VI furnishes less of the voltage Basically, circuit VI is responsible for what may be called the proper increase in torque applying to the reel as the radius arm increases (for substantially enough constant applied tangential force to FM); and circuit VII responds to torque changes resulting from incipient variations in tension of FM and corrects for these independently of any undesirable slip-torque characteristics of the clutch.

Stated from another viewpoint, circuit VI provides a lower and lower proportion of the voltage to control the firing of tubes 1 and 2 and circuit VII supplies more and more of it as the action proceeds. Thus once the process starts, circuit VI, which originally determined the top speed for the empty core, slowly surrenders its control to circuit VII.

The running speed and threading speed can be set by the two potentiometers (R—8 and R—8a) in circuit IV; R—8 controlling the running speed and R—8a the threading speed. Operation of SW—3 transfers the connections from the threading speed to the running speed by cutting out R—8a and cutting in R—8. Switch SW—1 is used to eliminate circuit V. Under certain conditions the control from the processing machine is not required and manual speed control by means of potentiometer R—8 is required independently of the speed of the material. For this purpose switch SW—1 may be operated to cut out circuit V. Also, the torque control circuit VII can be disconnected by means of switch SW—2. As an example, it may be desirable to start the drive at a low threading speed. In this case resistance R—8a is temporarily cut in and the processing machine operated at a low speed. The material is then threaded through P and applied to the core of the wind-up reel WP—1 and after a few revolutions at low speed, resistance R—8a is cut out and resistance R—8 is cut in. The processing machine is then brought up to running speed, at which speed the tension control functions, circuits V and VII being connected.

From the above it is now clear that the circuits VI and VII cooperate with each other, one of them (circuit VI) being responsive to speed and increasing torque as the reel slows down, and the other (circuit VII) being sensitive to current demand of the motor and tending to control the torque according to the torque demands.

As to the pay-off reel UW—1, the system for operating it is substantially the same as the one for the reel WP—1. The only difference is that the motor PW is driven in opposite sense to the motion of shaft OP—1 so that the necessary tension or drag may be applied to the raw material RM unwinding from the reel UW—1. The second circuit in unit CB—4 maintains the necessary constantly decreasing pay-off torque with increased reverse slip. In this case the circuit VI (fed by accelerating generator GN—3) gradually provides an increasing proportion of the voltage which circuit VII initially provided. This is because generator GN—3 speeds up with decrease in diameter of roll WO. The current at first drawn by motor PW is high so that at first circuit VII in its control activities supplies the chief control voltage which is gradually increasingly supplied by circuit VI as the generator GN—3 speeds up. Thus applied torque decreases as the pay-off roll becomes smaller and speeds up.

When considering the action of the pay-off control unit CB—4 which is the same as the wind-up control unit CB—1, it should be noted that what is indexed as generator GN—2 in Figs. 2 and 5 becomes generator GN—3; and what is indexed as clutch EC—2 in these figures becomes clutch EC—1. Also, what is motor WM becomes motor PW.

Figure 8:
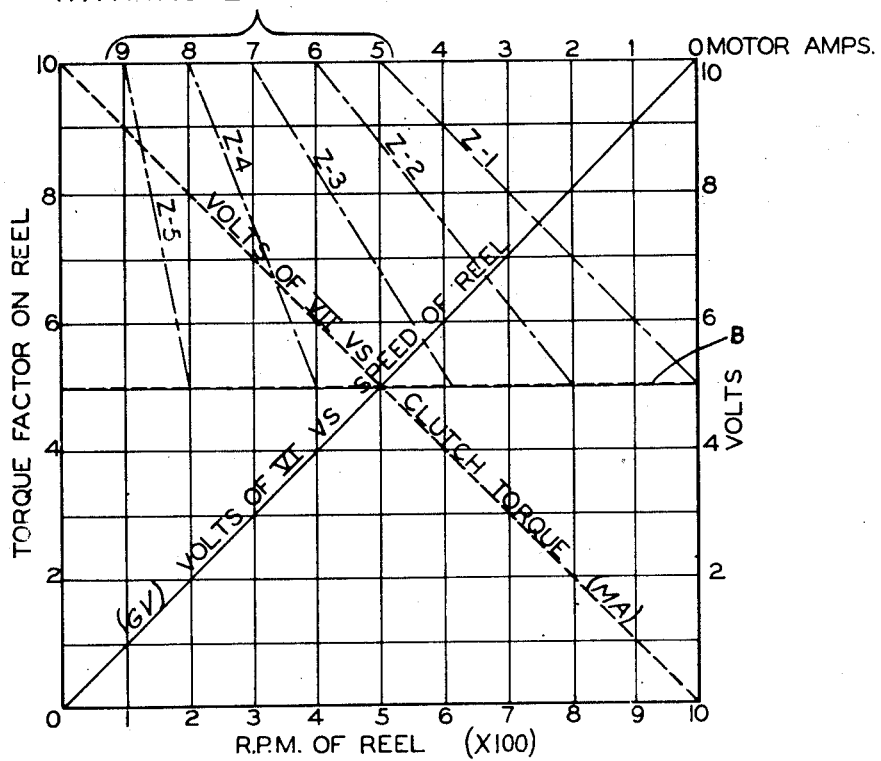

In Fig. 8 are shown exemplary ideal relationships between speed, torque and control voltages. Scale values have been selected for speed, torque, amperes and volts such that the same numbers on the various scales represent magnitudes of more than one function.

GV is a straight-line curve of volts of circuit VI fed by generator GN—2 or GN—3, as the case may be. It will be recalled that these generators which are controlled by reel speeds, serve the respective control units CB—1 and CB—4 with voltages proportional to the respective reel speeds. The voltage output of circuit VI plotted against speed of WP—1 is thus represented by line GV.

MA is a straight-line voltage curve of voltage output of circuit VII. It will be recalled that this straight-line function is due to the substantially straight-line function between the motor amperes drawn by motor WM proportional to its torque. Thus curve MA represents volts of VII plotted against torque required of EC—2 for constant tension.

The horizontal line B represents a selected base or core torque required for the tension desired.

The straight-line curves Z—1, Z—2, Z—3, Z—4 and Z—5 are torque-speed curves which in common practice correctly enough represent the conditions required for different thicknesses of materials. Their slopes or declines increase with increasing thicknesses of materials. To another scale they also represent voltage changes required, during reeling, of the transformer T—10.

For example, curve Z—1 shows a speed for reel WP—1 of 1000 R. P. M. when the roll WU is starting at the core WP—C. This corresponds to the lower torque of 5. It also shows a speed of 500 R. P. M. of this reel when the roll WU has doubled its diameter, which corresponds to the higher torque of 10. Since the voltage-speed curve GV is a straight line, a gradual change of 1000 to 500 in speed means a gradual drop of 10 to 5 in volts supplied by the generator GN—2. This means a gradual drop of 5 volts from circuit VI. This is accompanied by a gradual rise of 5 volts in circuit VII, or a ratio of 1:1 voltage exchange between VI and VII. Consider another example in line Z—4 of the chart as follows: A drop of 200 R. P. M. corresponds to a drop of 2 volts in circuit VI (caused by a drop in speed from 400 R. P. M. to 200 R. P. M. of the generator GN—2).

This 2 volts drop in VI is balanced by a 2 volts increase in voltage from circuit VII.

In other words, any loss of voltage supplied from circuit VI is made up for by a gain in equal voltage supplied from circuit VII, the ratio of loss to gain being always 1:1. Also, the applied torque rises proportionally to the speed drop.

Potentiometer R—12 sets the value of the torque at a given starting point or base, represented by line B. Potentiometer R—12 having been set, in order to adjust the system to the 2 volts interchange above referred to in the second example, it is merely necessary to adjust the voltage output change of circuit VII to balance the voltage output change in circuit VI. This is done by adjusting point 19A of potentiometer R—11. A trial of this can be made by using voltmeters across the active portions of the resistances R—10 and R—11.

Thus the user may select any base torque for the starting condition on core WP—C (represented by line B) and by adjusting potentiometer R—11 there can be brought about a rate of rise in voltage in circuit VII (due to torque changes) equal to the rate of fall in voltage in circuit VI (due to speed drop). All the while circuit VII exercises its governing control of incipient deviations of torque from values which will maintain a constant tension.

It must be remembered in addition that a basic top speed must be determined by adjusting the potentiometer R—8 for the high speed point with a bare core WP—C at the start of operations.

As another specific example, suppose operation is desired under conditions of material for which curve Z—5 is desired (Fig. 8). This corresponds to the following conditions:
(1) Top speed of reel at the start=200 R. P. M.
(2) Finish speed of reel at the end=100 R. P. M.
(3) Starting torque at the core WP—C=5 units.
(4) Finish torque at double the radius of the core=10 units.

To obtain these conditions, potentiometer R—8 is set for a voltage output of circuit IV corresponding to a speed of 200 R. P. M. This automatically takes into account the voltage from generator GN—1 actuated by the machine P. In other words, the speed of machine P is a factor in setting the speed of the reel. Potentiometer R—11 is set so that an interchange of 1 volt will occur as between circuits VI and VII, potentiometer R—12 being set at a point equivalent to the proper number of units of motor current, which is to say the proper number of units of torque for the tension desired. This would be 5 units in the present example.

All circuits are energized when the machine starts. The clutch EC—2 accelerates the drive up to the speed required of the reel WP—1 necessary to maintain a tension on the material which is then and thereafter controlled by circuit VII. As the speed drops the circuit VII also takes over the voltage supply relinquished by circuit VI as it functions to its control speed.

Commercial designations for the various tubes that are useful in the various locations are as follows:

| | |
|---|---|
| Tubes 1 and 2 | ELC6J |
| Tube 3 | 6N7 |
| Tubes 5, 8, 9 and 10 | 6X5 |
| Tube 7 | 5U4G |
| Tubes 4 and 6 | VR-75 |

Values of other items in the circuit are designated on the drawings.

It is to be understood that the described control may be used in connection with the one reel only, since it is not always necessary to control both reels.

Reference is hereby made under the requirements of Rule 43 to my copending divisional applications of the present application as follows: Serial No. 655,699, filed March 20, 1946, for Control apparatus; and Serial No. 665,884, filed April 29, 1946 for Electronic control apparatus, eventuated as Patent 2,458,454.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Material reeling apparatus comprising a rotary reel for a winding of the material, means for maintaining a substantially constant linear velocity of the material, the winding having an increasing winding diameter as the reel rotates whereby the speed of the reel decreases, an A. C. overrunning motor for turning the reel, an electric slip coupling between the motor and the reel, an electric field in said slip coupling, said decreasing reel speed increasing slip in the coupling accompanied by an increase in driving torque applied by the motor through the coupling and accompanied by an increase in the motor current, and circuit control means responsive to said increase in motor current and responsive to incipient reduction in reel speed adapted to control the energization of said field so as to adjust the slip in said coupling so as to produce a torque delivered from the motor to the reel which will maintain substantially constant tension in said material as the winding diameter increases.

2. Tension control apparatus comprising a reel, an A. C. motor, an A. C. circuit therefor, an eddy-current slip clutch connecting the motor with the reel, a field winding in the clutch, a principal rectifier circuit feeding said clutch winding, a grid-controlled rectifier tube in said circuit, a grid-controlled control tube controlling the grid of the rectifier tube, a main reference voltage circuit connected with said control tube and said principal rectifier circuit so that normally said rectifier tube fires into said winding to energize it, a grid for the control tube, a governing rectifier circuit controlling said grid, a current transformer in one leg of said A. C. circuit, said transformer feeding said last-named governing rectifier circuit, whereby increased current delivered to said motor under increased load conditions thereon biases said control tube toward firing so as to bias the grid in the rectifier tube toward a condition of lower output from the rectifier tube.

3. Tension control apparatus comprising a reel, an A. C. motor, an eddy-current slip clutch connecting the motor with the reel, a field winding in the clutch, an A. C. circuit serving the motor, a principal rectifier circuit feeding said clutch winding, a grid-controlled rectifier tube in said circuit, a grid-controlled control tube controlling the grid of the rectifier tube, a main reference voltage circuit connected with said control tube and said principal rectifier circuit so that normally said rectifier tube fires into said winding, a grid for the control tube, a governing rectifier circuit controlling said grid, a current transformer in one leg of said A. C. circuit, said transformer feeding said last-named governing rectifier circuit, whereby increased current delivered to said motor under increased load conditions thereon biases said control tube toward firing so as to bias the grid in the rectifier tube toward a condition of lower output from the rectifier tube, a speed-control rectifier circuit, a generator driven by the clutch and feeding the speed-control circuit, said speed-control circuit in response to decreased generator speed and output biasing said control tube toward reduced output, whereby said grid-controlled rectifier tube in the main rectifier circuit tends to produce higher output into said clutch field winding, except as modified by action from said current-controlled governing circuit.

4. Material reeling apparatus comprising a rotary reel for a winding of the material, said winding being of changing diameter, an A. C. motor for controlling rotation of the reel and supplied by an A. C. circuit, an electric slip coupling between said motor and the reel, a D. C. field winding in the slip coupling, a D. C. rectifier circuit feeding said field winding and including a grid-controlled rectifier tube, a current transformer having a secondary and a primary, the latter being connected in one leg of said A. C. circuit to the motor, a control circuit connected to the secondary of said current transformer and supplied thereby and controlling said rectifier circuit through the grid of said tube, and a voltage transformer having a primary connected to the A. C. circuit and connected with the current transformer by means adapted to produce a controlling action by said control circuit which is substantially proportional to the torque on said motor.

5. Material reeling apparatus comprising means for moving a length of the material at substantially constant speed, a rotary reel for a winding of the material which winding is of changing diameter, an A. C. motor for driving the reel and supplied by an A. C. circuit, an electric slip coupling between said motor and the reel, a D. C. field winding in the slip coupling, a D. C. rectifier circuit feeding said field winding and including a grid-controlled rectifier tube, a current transformer having a primary connected in one leg of said A. C. circuit to the motor and having a secondary, a control circuit supplied by said secondary and controlling said rectifier circuit through the grid of said tube, whereby the energization of said field winding is caused to respond to change in current drawn by the motor, and means connected to the control circuit whereby the torque supplied by the slip coupling to the reel from the motor is caused substantially constantly to produce torque through the reel which will apply a substantially constant tension to said length of material.

6. Material reeling apparatus comprising means for moving a length of material at predetermined velocity, a rotary reel for supporting a winding of the material which winding changes in diameter, an A. C. motor for controlling rotation of the reel and being supplied by an A. C. circuit, an eddy-current slip coupling between the motor and the reel, a D. C. field winding in the slip coupling, a D. C. rectifier circuit feeding said field winding and including a grid-controlled rectifier tube, a main reference voltage circuit and coordinated bridge circuit adapted normally to maintain a positive value of the tube grid to fire said rectifier circuit into said winding, a second grid-controlled rectifier tube forming one branch of said bridge circuit, auxiliary D. C. reference voltage circuit means adapted to apply to the grid of the second tube negative voltage tending to suppress said second tube and permit said firing of the first tube, a governing circuit controlling the grid of said second tube and operating in negative voltage opposition to said adjustable reference voltage circuit and tending to make more positive the grid of said second tube and tending to fire the second tube into the grid of the first tube to exert controlled suppression of its firing into said winding.

7. Material reeling apparatus comprising means for substantially constantly moving a length of material, a rotary reel for supporting a winding of the material which winding is of changing diameter, an A. C. motor for controlling rotation of the reel and supplied by an A. C. circuit, an eddy-current slip coupling between the motor and the reel, a D. C. field winding in the slip coupling, a D. C. rectifier circuit feeding said field winding and including a grid-controlled rectifier tube, a main reference voltage circuit and coordinated bridge circuit adapted normally to maintain a positive value of the tube grid to fire said rectifier circuit into said winding, a second grid-controlled rectifier tube forming one branch of said bridge circuit, adjustable D. C. reference voltage circuit means adapted to apply to the grid of the second tube negative voltage tending to suppress said second tube and permit continued firing of the first tube, a governing circuit having a D. C. section controlling the grid of said second tube and operating in negative voltage opposition to said adjustable reference voltage circuit and tending to fire the second tube into the grid of the first tube to bias said first tube toward suppression of its firing into said winding, a current transformer responsive to current in one leg of said A. C. circuit supplying the motor and having a secondary, and a transformer section in said governing circuit connected with said secondary and feeding into said governing circuit.

8. Material reeling apparatus comprising means for substantially constantly moving a length of material, a rotary reel for supporting a winding of the material which winding is of changing diameter, an A. C. motor for controlling rotation of the reel and supplied by an A. C. circuit, an eddy-current slip coupling between the motor and the reel, a D. C. field winding in the slip coupling, a D. C. rectifier circuit feeding said field winding and including a grid-controlled rectifier tube, a main reference voltage circuit and coordinated bridge circuit adapted normally to maintain a positive value of the tube grid to fire said rectifier circuit into said winding, a second grid-controlled rectifier and amplifier tube forming one branch of said bridge circuit, adjustable D. C. reference voltage circuit means adapted to apply to the grid of the second tube negative voltage tending to suppress said second tube and permit continued firing of the first tube, a governing D. C. circuit having a D. C. section controlling the grid of said second tube and operating in negative voltage opposition to said adjustable reference voltage circuit and tending to fire the second tube into the grid of the first tube to bias said first tube toward suppression of its firing into said winding, a current transformer responsive to current in one leg of said A. C. circuit supplying the motor and having a secondary, a transformer section in said governing circuit connected with said secondary and feeding into said governing circuit, and a voltage transformer connected to said A. C. circuit and cooperating with said transformer section to produce a D. C. potential in said governing voltage circuit which is proportional to the torque required of said motor in order to maintain a substantially constant tension in said material.

9. Tensioning apparatus comprising a reel, an A. C. motor associated with the reel, an eddy-current slip clutch between the motor and the reel, a field winding in said clutch, an A. C. circuit feeding said motor, a principal rectifier circuit fed by said A. C. circuit and including grid-controlled rectifier tubes firing into said coil, a controlled amplifier tube controlling said rectifier tubes, a main reference voltage circuit, an adjustable reference voltage circuit associated with said main reference voltage circuit, an auxiliary reference voltage circuit connected with said adjustable reference voltage circuit, said reference voltage circuits being connected with said amplifier tube in a manner tending to prevent the amplifier tube from firing into the grids of the rectifier tubes thus favoring firing of the latter into said coil, an A. C. generator driven by the clutch, a governing rectifier circuit fed by the generator, a second governing rectifier circuit, a current transformer fed by one leg of the A. C. circuit which feeds the motor and supplying said second governing circuit, said governing circuits being connected in voltage opposition with respect to said adjustable and auxiliary reference voltage circuits and controlling firing of the amplifier tube into the grids of the first-named rectifier tubes to exert controlling cut-off action on said tubes.

10. A tension control apparatus comprising a reel for material being wound, an A. C. motor for driving the reel, an A. C. circuit for the motor, an eddy-current slip clutch connecting the motor with the reel, a field winding in said clutch, a first A. C. generator driven by the reel, a second A. C. generator driven in accordance with linear speed of the material approaching the reel, a rectifier circuit fed from said A. C. circuit and including a rectifier tube firing into said clutch coil, a grid controlling said tube, a control tube for said grid, a grid control for said control tube, a basic reference voltage circuit connected with the grid of said rectifier tube normally causing said tube to fire into said coil, an additional reference voltage circuit associated with said main reference voltage circuit and fed by said second generator, a governor circuit fed by said first generator, said governing circuit affecting the grid of the control tube decreasingly to cause said control tube to fire into the grid of the rectifier tube as reel speed decreases to reduce firing of the latter, and a circuit fed by means responsive to current in the A. C. circuit to the motor, said last-named circuit upon increase in current increasingly firing the control tube into the grid of said rectifier tube whereby the latter tends to be cut off and slip is increased in said clutch to control tension in said material.

11. A tension control apparatus comprising a reel for material being wound, an A. C. motor for driving the reel, an A. C. circuit for the motor, an eddy-current slip clutch connecting the motor with the reel, a field winding in said clutch, an A. C. generator driven with the reel, an A. C. generator driven in accordance with linear speed of the material approaching the reel, a rectifier circuit fed from said A. C. circuit and including rectifier tubes firing into said field winding of the clutch, grids controlling said tubes, a control tube having anodes respectively feeding said grids, grid controls for the anodes of said control tube, a basic reference voltage circuit connected with the grids of said rectifier tubes biasing said tubes to fire into said coil, an additional reference voltage circuit associated with said main reference voltage circuit and fed by said generator controlled by the linear velocity of the material, a governor circuit fed by said generator which is driven with the reel, said governor circuit controlling the grids of the control tube with decreased reel speed to cause the anodes of said control tube decreasingly to fire into the grids of the rectifier tubes, thereby controllably to increase firing of the latter, and a governing circuit fed by means responsive to current in the A. C. circuit to the motor as the motor current increases with any increased load, said last-named circuit controlling the grids of the control tube so as to increase firing in response to increased current in the A. C. circuit, firing being into the grids of said rectifier tubes whereby the rectifier tubes tend to fire less and whereby slip is increased in said clutch.

12. Material reeling apparatus comprising a rotary reel for a winding of material to be formed on the reel under substantially constant tension and speed of the material approaching the reel, the winding having a changing winding diameter as the reel rotates, a motor for turning the reel, an electric slip coupling between the motor and the reel, a field winding in the slip coupling, means for energizing the winding responsive to change of slip in the coupling as the winding diameter changes and tightening or loosening the coupling in a substantially direct proportion to the winding diameter, and means responsive to load change on the motor caused by increased slip due to changing winding diameter and any incipient variation in tension adapted to maintain said tension substantially constant.

13. Material reeling apparatus comprising a rotary reel for a winding, the material to be applied to the reel under substantially constant tension and speed, the winding having a changing winding diameter as the reel rotates, a motor for turning the reel, an electric slip coupling between the motor and the reel, a field winding in the slip coupling, means for energizing the winding responsive to change of slip in the coupling as the winding diameter changes and consequently tightening or loosening the coupling in a substantially direct proportion to the winding diameter, means responsive to load change on the motor caused by increased slip due to any changing winding diameter and also caused by incipient variation in tension for maintaining said tension substantially constant, said last-named means including a current transformer responsive to all components of the current supplied to the motor except the motor magnetizing component of said current.

14. Tension control means for a length of material comprising a pay-off reel and a wind-up reel therefor, means for controlling the linear velocity of said material between reels, both of said reels turning in the same direction, a driving motor associated with the wind-up reel and rotary in the same direction, a retarding motor associated with the pay-off reel and rotary in the opposite direction, electric slip clutches magnetically connecting the respective motors with the respective reels, field windings in said clutches, means for energizing said field windings to vary the intensities of the magnetic couplings through the clutches in response to their respective slips, so that the torques applied to the reels are respectively in a substantially direct proportion to the respective winding radii, and means responsive to current and voltage supplied respectively to said motors for respectively controlling slip of said clutches to maintain constant the tension in said material.

15. Tension control apparatus comprising a reel, an A. C. motor, an A. C. circuit therefor, an eddy-current slip clutch connecting the motor with the reel, a field winding in the clutch, a principal rectifier circuit feeding said clutch winding, a grid-controlled rectifier tube in said circuit, a grid-controlled control tube controlling the grid of the rectifier tube, a main reference voltage circuit connected with said control tube and said principal rectifier circuit and biasing said rectifier tube to fire into said winding to energize it, a grid for the control tube, a governing rectifier circuit controlling said grid, a current transformer in one leg of said A. C. circuit, said transformer feeding said last-named governing rectifier circuit, whereby increased current delivered to said motor under increased load conditions thereon biases said control tube toward firing so as to bias the grid in the rectifier tube toward a condition of lower output from the rectifier tube, and a governing circuit controlled by the speed of the reel and also controlling the grid of the control tube so that the control tube decreasingly or increasingly fires with decreasing and increasing speeds respectively of the reel, whereby the rectifier tube respectively increasingly or decreasingly energizes the clutch coil for controlling torque applied to the reel in substantial accordance with the roll diameter of any material being wound on the reel.

16. Material reeling apparatus comprising an electric slip coupling, a reel for the material driven by said coupling, an electric field means in the coupling determining its torque transmission, a generator driven in accordance with reel speed, a reference voltage circuit controlling energization of said field means and determining the speed of the reel at minimum diameter of material thereon, a speed-responsive voltage circuit responsive to action of said generator and additionally controlling energization of said field coil to increase or decrease torque transmitted through the coupling with speed decrease or increase respectively, and a torque control circuit connected with said speed control circuit and also controlling said field to maintain predetermined torque transmitted through the coupling at a given speed, whereby substantially constant tension is maintained in the material at all speeds.

17. Material reeling apparatus comprising an electric slip coupling, a reel for the material and driven by said coupling, an electric field in the coupling determining its torque transmission, a generator driven in accordance with reel speed, an adjustable reference voltage circuit controlling energization of said field means and determining the speed of the reel at minimum diameter of material thereon, a speed-responsive voltage circuit responsive to action of said generator and additionally controlling energization of said field coil to increase or decrease torque transmitted through the coupling with speed decrease or increase respectively, a torque control circuit connected with said speed control circuit and also controlling said field to maintain predetermined torque transmitted through the coupling at a given speed, and two adjustment means in said torque control circuit, one of which determines the slope of the torque-speed curve required for various thicknesses of materials to be reeled, and the other of which determines equal but inverse changes in the voltages supplied by the speed control and torque control circuits respectively.

18. Tension control means for a length of material comprising a pay-off reel therefor, means for controlling the linear velocity of said material as it moves from the reel, a retarding motor associated with said pay-off reel and rotary in the opposite direction, an electric slip clutch magnetically connecting the motor with the reel, a field winding in said clutch, means for energizing said field winding to vary the intensity of the magnetic coupling through the clutch in response to its slip, so that the torque applied to the reel is in a substantially direct proportion to the unwinding radii, and means responsive to current supply to the motor also for controlling slip of the clutch to maintain substantially constant the tension in said material.

ANTHONY WINTHER.

REFERENCES CITED

The following references are of record in the file of this patent:

UNITED STATES PATENTS

| Number | Name | Date |
|---|---|---|
| Re. 22,432 | Winther | Feb. 1, 1944 |
| 1,982,461 | Winther | Nov. 27, 1934 |
| 2,021,888 | Dawson | Nov. 26, 1935 |
| 2,234,746 | West | Mar. 11, 1941 |
| 2,237,112 | Parvin | Apr. 1, 1941 |
| 2,365,691 | Fodor | Dec. 26, 1944 |

FOREIGN PATENTS

| Number | Country | Date |
|---|---|---|
| 544,925 | Great Britain | May 4, 1942 |